UNITED STATES PATENT OFFICE.

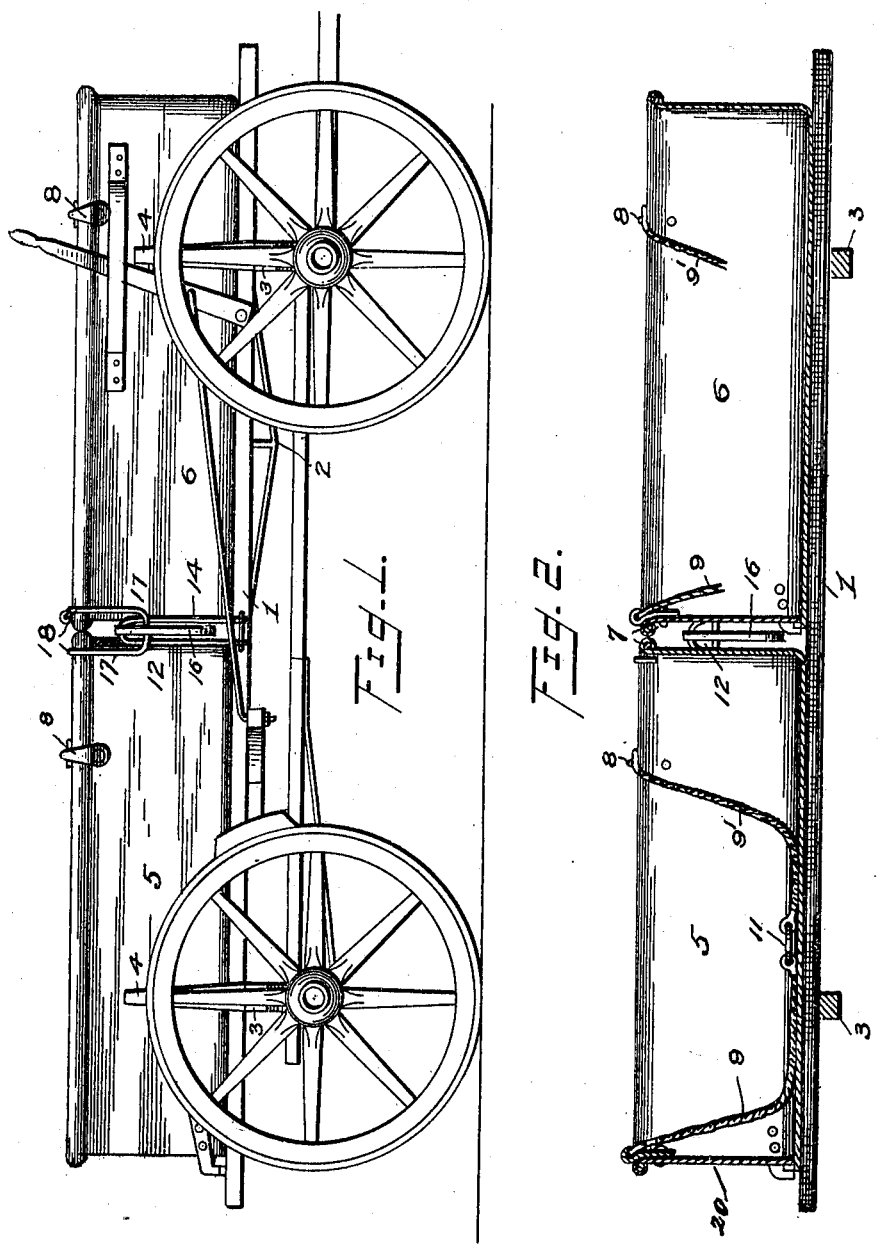

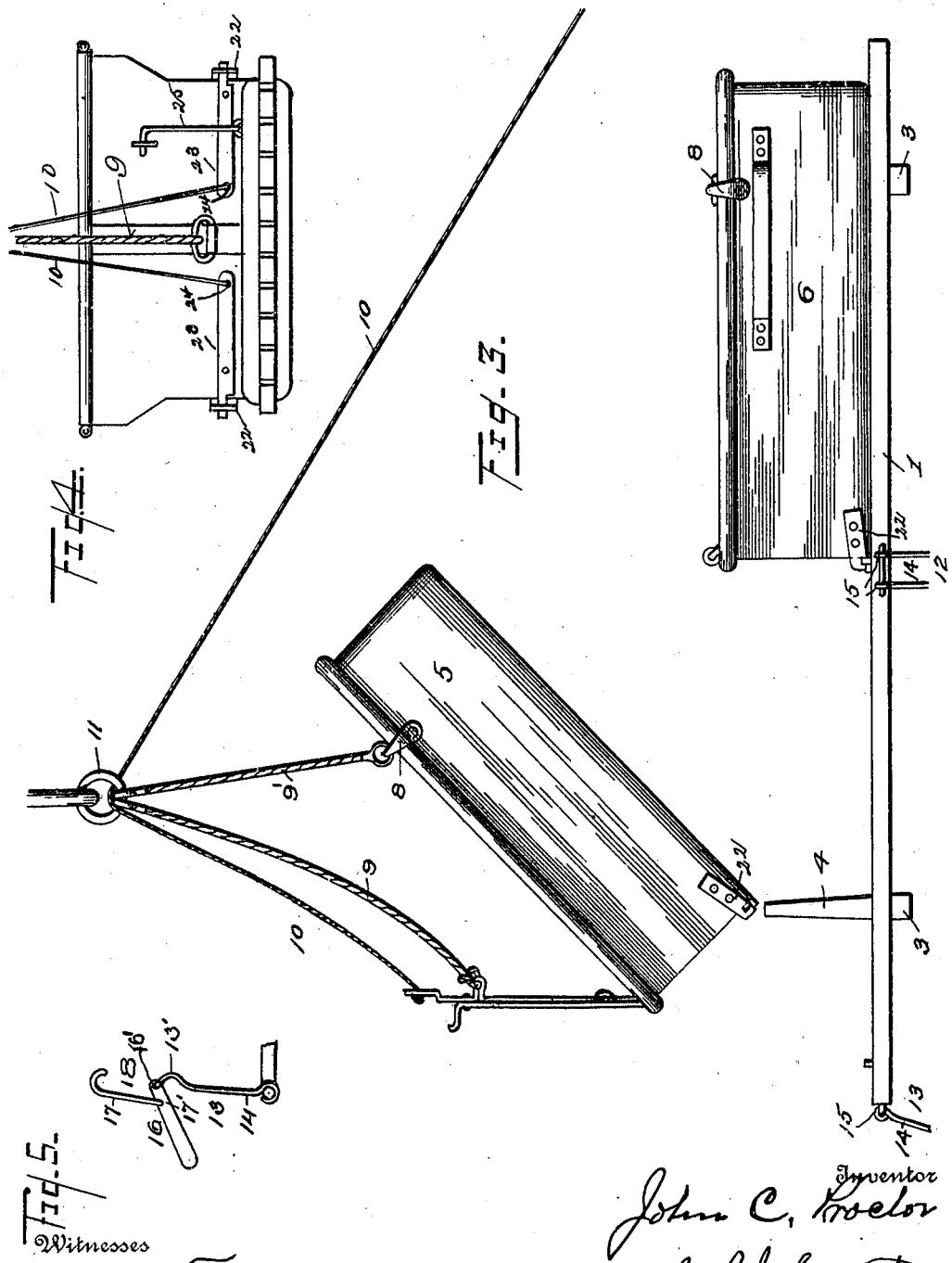

JOHN C. PROCTOR, OF SEATTLE, WASHINGTON.

WAGON-BOX FOR HOISTING AND DUMPING GRAIN, BEETS, &c.

978,336. Specification of Letters Patent. Patented Dec. 13, 1910.

Application filed July 24, 1909. Serial No. 509,410.

*To all whom it may concern:*

Be it known that I, JOHN C. PROCTOR, a citizen of the United States, and residing at No. 836 East Sixty-seventh street, Seattle, in the county of King and State of Washington, have invented certain new and useful Improvements in Wagon-Boxes for Hoisting and Dumping Grain, Beets, &c., of which the following is a specification.

My invention relates to dumping wagon boxes and more particularly to those made in sections which are adapted to be lifted from the bed of a wagon for manipulation.

The object of the invention consists in providing a removable wagon box which is adapted to be engaged by suitable hoisting apparatus, and lifted from the bed of the running-gear for dumping.

Further it is the object to provide such an apparatus which is particularly adapted for carrying, hoisting and dumping corn, sugar beets and other products.

Also, it has for an object to provide a wagon box which may be clamped on wagon beds or running-gear in sections or as a plurality of independent members.

Further, my object is to provide a wagon body which may be utilized independently and at will on any of the wagon beds and gears at present in vogue.

With these objects in view my invention consists in the construction and arrangement of parts, as will be hereinafter described and particularly pointed out in the claim.

In the accompanying drawings, Figure 1, is a side elevation of my invention. Fig. 2, is a vertical section of the same. Fig. 3, is a detail view illustrating one of the sections of the wagon body, in a dumping position. Fig. 4, is an end view of the sections and Fig. 5, is a view for showing the clamps for holding the inner ends of the sections of the wagon box to the bed of the running gear of the wagon.

Referring to the drawings, 1, designates the bed or bottom board of a wagon having the usual braking mechanism and also having a longitudinal truss 2, disposed on its lower side to strengthen and brace the same. Said bed 1, is also furnished near each end with transverse bars 3, upon the ends of which are mounted uprights or standards 4. Said standards are spaced apart to receive therebetween the sections 5 and 6, which compose the wagon-body, and form the dumping elements. Each of said sections comprises a box like structure having a bottom and formed of any suitable material, as sheet metal or wood, preferably the former. When sheet metal is used bracing rods 7 are provided around the top of said section. This affords a strong and efficient structure which is capable of withstanding the strains of hoisting and manipulation. At corresponding points on opposite sides of said sections, preferably the longitudinal sides thereof, and located nearer one end than the other, is a pair of loops or eyelets 8, which are, or may be formed of short bars and conformed to the upper edge of the sections, and secured by rivets or bolts. Said loops are spanned by ropes or other flexible means 9' by means of which the sections may be hoisted. Said sections are provided with gates 20, hinged at their upper edges to the sections of the wagon body. The rope 9', has its lower ends connected to the eyelets 8, and its upper end connected to a ring 11. The rope 9, has its upper end also connected to the ring 11, while its lower end is connected to the gate by any suitable means whereby said gate is tilted upward as shown in Fig. 3. Said sections are secured to the wagon body at their ends by means of side clamps 12; said clamps each consist of a yoke member 14, having its lower free ends 15, pivotally secured to the wagon bed on opposite sides thereof. A lever 16, is pivoted as at 16', at one end to the upper end of said yokes 14. A yoke 18, is also pivoted to the lever, and adjacent to the end, to which the lever 16, is pivoted as shown at 17'. The yoke 18, is provided with a pair of hooked fingers 17, to engage the inner ends of the upper surfaces or edges of the sections as shown in Fig. 1; and by forcing the lever 16, downwardly, the hooks are clamped to said upper edge of the sections.

Near the upper ends of the yokes 14, the arms are curved inwardly as at 13', to allow the pivot 17' to pass inward beyond the pivot at 16' when the lever is forced downwardly. An upward pressure on the lever 16, will release the fingers 17. Secured to the opposite ends of the sections, and projecting beyond the same are catches 22, and to the opposite lower end portions of the gates are pivoted latches 23, having their ends projecting beyond the face of the gates, said projections serving to engage the catches 22, whereby to hold the gates in a closed position. The inner ends of the latches are provided with openings 24, to which is attached a guy rope 10. Said rope passes through the ring 11, and when a pull is made on said rope 10, the gate is released so as to be swung upward by the rope 9. The ends of the sections are held to the platform or running gear of the wagon by means of hooks 25.

Having described my invention, what I claim is—

A sectional wagon body, comprising the platform of the running gear having clamps pivoted to the opposite sides thereof, one part of each of the clamps having a bend at its upper end and a curve at right angles to the bend, a lever pivoted to said bend, a second part having a bend on its lower end with the lever also pivoted thereto, said second part having upwardly extended arms provided with hooks on their upper ends which are adapted to engage the inner upper edges of two sections when the lever is forced downward so as to hold the inner ends of the two sections in contact with the platform of the wagon body, and hooks for holding the outer ends of said sections to said platform, substantially as specified.

In testimony whereof I affix my signature in presence of two witnesses.

JOHN C. PROCTOR.

Witnesses:
W. A. BURLEIGH,
E. P. CHURCHILL.